No. 822,917. PATENTED JUNE 12, 1906.
F. A. BRINKMANN.
GRAIN MEASURING DEVICE.
APPLICATION FILED OCT. 8, 1904.
3 SHEETS—SHEET 1.
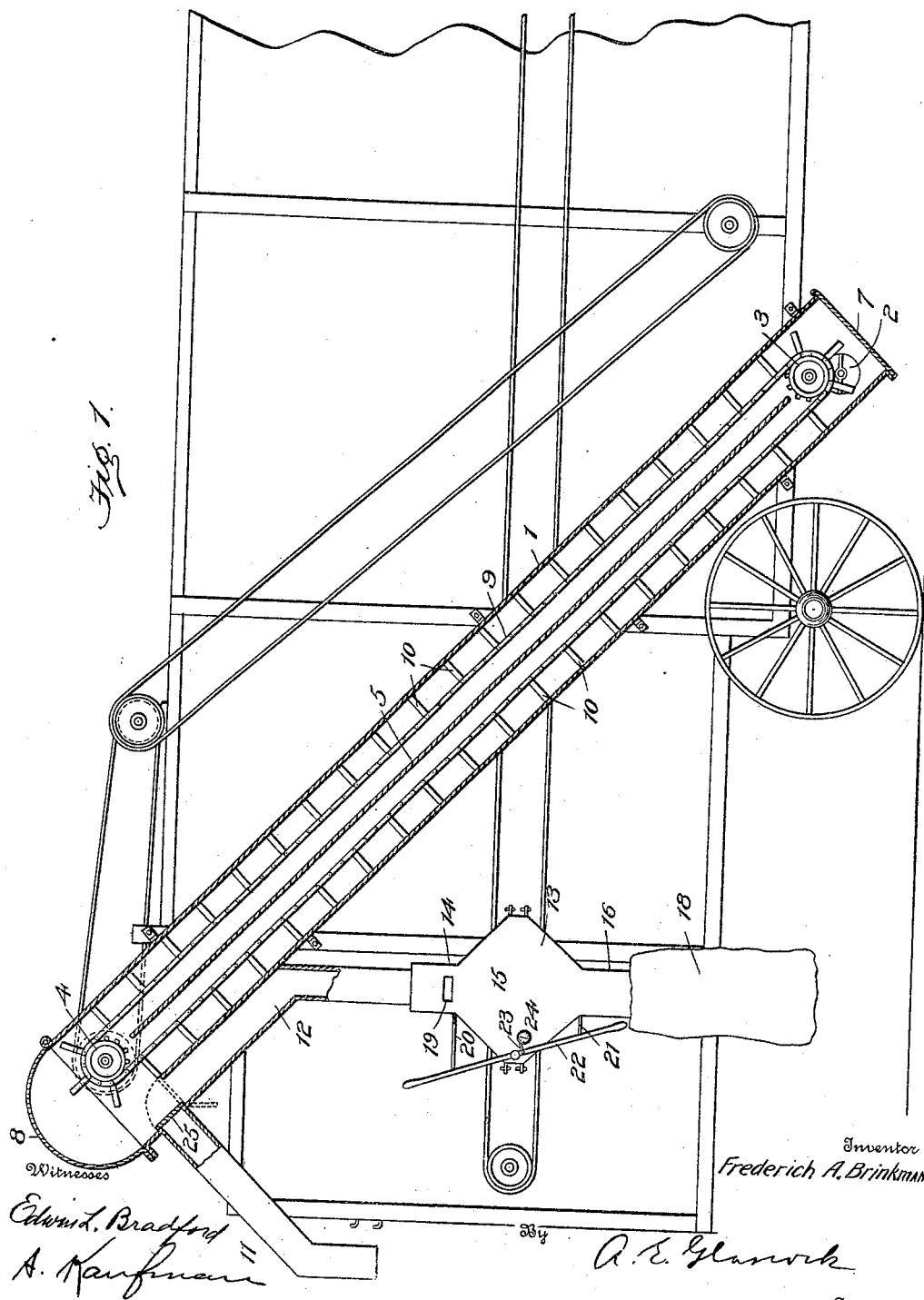

No. 822,917. PATENTED JUNE 12, 1906.
F. A. BRINKMANN.
GRAIN MEASURING DEVICE.
APPLICATION FILED OCT. 8, 1904.
3 SHEETS—SHEET 2.
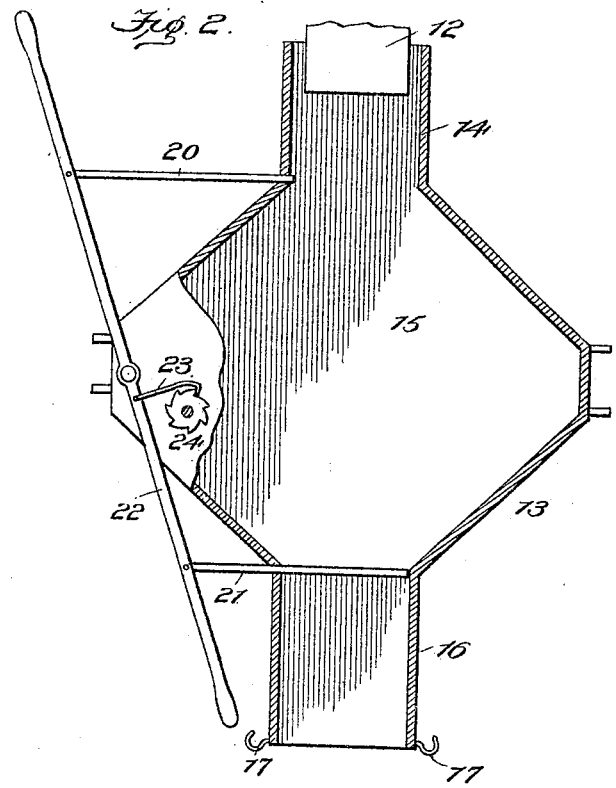
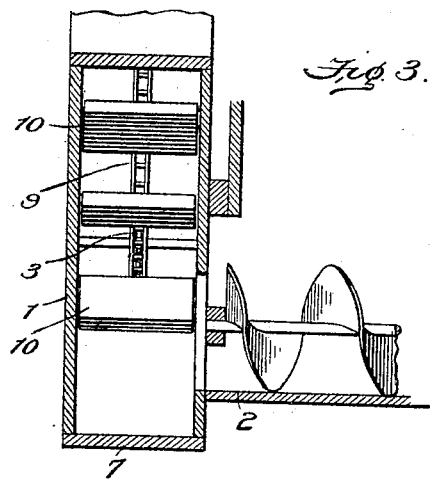
Witnesses
Edwin L. Bradford
A. Kaufman
Inventor
Frederich A. Brinkmann
By A. L. Glawick
Attorney

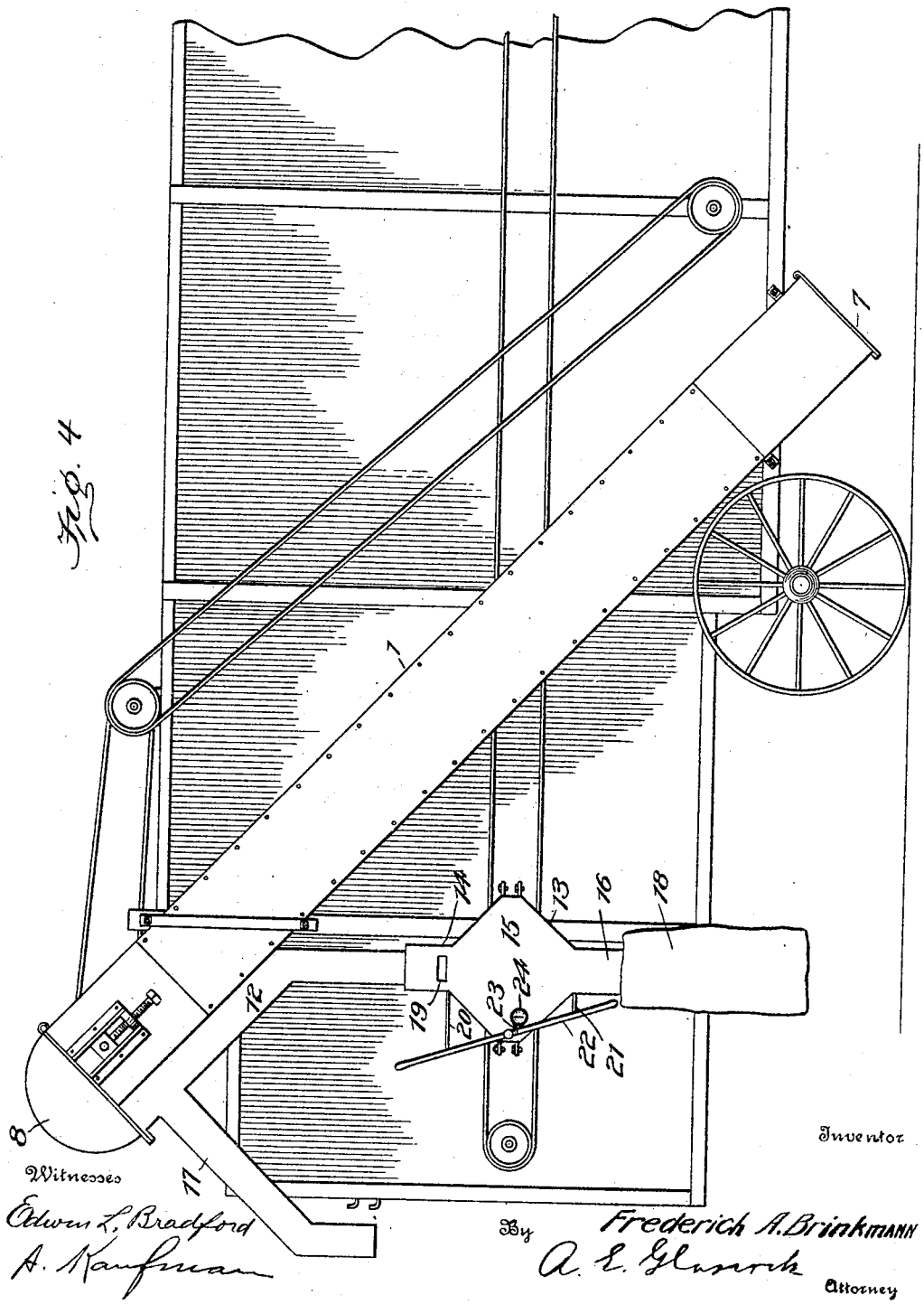

UNITED STATES PATENT OFFICE.

FREDERICH A. BRINKMANN, OF PLUMHILL, ILLINOIS.

GRAIN-MEASURING DEVICE.

No. 822,917.  Specification of Letters Patent.  Patented June 12, 1906.

Application filed October 8, 1904. Serial No. 227,692.

*To all whom it may concern:*

Be it known that I, FREDERICH A. BRINKMANN, a citizen of the United States, residing at Plumhill, in the county of Washington and State of Illinois, have invented new and useful Improvements in Grain - Measuring Devices, of which the following is a specification.

This invention has relation to grain-measuring devices; and it consists in the novel construction and arrangement of its parts, as hereinafter shown and described.

The object of the invention is to provide a grain-measuring device adapted to be applied to a grain thresher or separator.

The device is so located and arranged that the thresher may be placed near the stack of grain without interfering with the operation of the said device.

The device consists of a grain-conveyer attached to the side of the thresher and adapted to elevate the grain from the outlet of the thresher and carry the same toward the rear end of the thresher, where it is passed through the measuring device into bags or other receptacles. The measuring device is provided with an upper and lower slide or valve, which are connected together by an operating-lever in such manner that when one valve is opened the other is closed, and vice versa.

The measuring device is further provided with an indicator or register, which indicates the quantity of grain that passes through the said device.

In the accompanying drawings, Figure 1 is a side elevation of the rear portion of a threshing-machine, showing my invention applied thereto. Fig. 2 is a vertical sectional view of the grain-measuring device. Fig. 3 is a horizontal sectional view of the grain-outlet of the thresher and the lower portion of the conveyer; and Fig. 4 is a side elevation of a threshing-machine, showing my invention applied thereto.

The conveyer consists of the casing 1, the lower end of which is opposite the grain-outlet 2 (see Fig. 3) of the thresher. The sprocket-wheel 3 is journaled in the lower end of the casing 1 and the sprocket-wheel 4 is journaled in the upper end of said casing. The board 5 extends approximately from the shafts of the sprocket-wheels 3 and 4. The sprocket-wheel 3 is in a fixed position with relation to the casing 1, while the sprocket-wheel 4 may be adjusted longitudinally with relation to said casing. The lower end of the casing 1 is closed by a hinged cap 7 and the upper end is closed by a hinged cap 8. The chain or belt 9 passes around the sprocket-wheels 3 and 4, said chain or belt being provided at suitable intervals on its outer surface with the blades 10, which extend transversely across the casing 1. The upper ends of the chutes 11 and 12 are attached to the upper end of the casing 1 and a valve 25 is provided, which is adapted to be swung in such position as to close the upper end of one or the other of the chutes 11 or 12. The chute 11 leads out beyond the framework of the rear end of the thresher, while the chute 12 leads down under the casing 1. The measuring device 13 may be applied to the lower end of either chute 11 or 12, as conditions or conveniences may require. When the said measuring device is applied to the lower end of the chute 12, the valve 25 is made to close the upper end of the chute 11, and when the measuring device is applied to the lower end of the chute 11 the valve 25 is made to close the upper end of the chute 12.

It will be obvious from the foregoing that when one of the chutes 11 or 12 has the grain-measuring device applied thereto the other chute will act in an auxiliary capacity, admitting of passage of the grain through the same in the event it is desired to dispense with the use of the measuring device. This may be done by simply adjusting the valve 25 to close the chute leading to the measuring device and open that not having such device. The operator may thus very readily change the direction of flow of the grain from one chute to the other, this being advantageous when it is considered that at times the grain must be fed to a wagon or large receptacles of much greater capacity than the sacks suspended from the grain-measuring devices as quickly as possible, in which instance the grain-measuring mechanism would be an impediment, for reasons which will be apparent.

It will be noted that the cap 8 at the upper end of the conveyer-casing 1 is common to the inlets of both of the chutes 11 and 12, thereby facilitating access thereto should the same become clogged or necessitate repair or the like. The location of said cap 8 is also such that access may be readily had to the valve 25 to adjust the same or for any purpose which may arise under actual conditions of service.

The arrangement of the chutes 11 and 12 is very peculiar. They extend from one another at approximately a right angle, inclining downwardly. The conveyer-casing 1 forms the upper wall of the chute 12, and the lower wall of said chute joins the similar wall of chute 11. The valve 25 is pivoted at the point of jointure of the lower walls of the two chutes 11 and 12 and may thus be actuated to assume a position practically in line with either of such walls. This will cause the grain delivered from the upper end of the conveyer to either chute 11 or 12 (according to the position of the valve 25) to flow directly to such chute over a side of the valve. (See dotted and full line positions of valve 25 in Fig. 1 of the drawings.)

The measuring device 13 consists of a collar 14, which is adapted to receive the lower end of either the chute 11 or 12. The lower end of said collar 14 is attached to the top of the enlarged central portion 15 of the said measuring device 13, and the outlet 16 is attached to the bottom of the central portion 15. The said outlet 16 is provided on its outer sides with the bag-hooks 17, which are adapted to engage a bag 18. The collar 14 is provided with a glass-covered aperture 19, and the sliding valve 20, being practically on a line with this opening 19, is located at the base of said collar and enters the same through a side slot. The sliding valve 21 is located at the top of the outlet 16 and enters the same through a side slot. The lever 22 is fulcrumed to the outer side of the enlarged portion 15 and is attached to the outer ends of the valves 20 and 21 in such manner that when one valve is pushed in the other valve is pushed out, and vice versa. The lever 22 is provided with a pawl 23, which engages a ratchet-disk 24, journaled to said enlarged portion 15. Said ratchet-disk is adapted to operate an indicator or register of ordinary construction. (Said indicator or register is not shown in the drawings, as it forms no part of this invention.)

The operation of the device is as follows: The grain is delivered from the thresher into the lower end of the casing 1, from which point it is carried up along the lower side of said casing by the blades 10, it being understood that rotary movement is transmitted from the thresher to the sprocket-wheel 4, which in turn moves the chain or belt 9. As the grain reaches the upper end of the casing 1 it is deposited in either the chute 11 or 12. It then passes into the measuring device 13, the valve 21, having previously been closed. When the grain reaches the level of the aperture 19, the operator moves the lever 22 in such manner as to close the valve 20 and open the valve 21. Consequently the grain in the body portion 15 passes through the outlet 16 into the bag 18. When the said body portion 15 is emptied, the operator reverses the movement of the lever 22, which opens the upper valve and closes the lower valve, and at the same time the pawl 23 engages a ratchet of the disk 24 and causes the same to make a partial rotation. This rotation is transmitted to the indicator or register above referred to, and a record of the quantity of grain passing through the device is kept.

Having described my invention, what I claim as new, and desire to secure by Letters Patent, is—

In combination, a conveyer embodying an inclined casing, chutes extending downwardly from the upper end of the casing and arranged at approximately a right angle to each other being joined at their upper ends, one of the chutes extending longitudinally of and at the under side of the conveyer and having measuring means in its length, the adjacent side of the conveyer-casing forming a side of the last-mentioned chute, a valve pivoted at its lower end at the point of jointure of the chutes and adapted to be turned into a position to close either one of the chutes and open the other or vice versa, and a cap pivoted to the upper wall of the casing of the conveyer at its upper end and normally closing such end, said cap when opened admitting of access to the upper end portions of the chutes, the valve arranged at this point, and the upper portion of the conveyer mechanism.

In testimony whereof I have signed my name to this specification in the presence of two subscribing witnesses.

FREDERICH A. BRINKMANN.

Witnesses:
 EMIL D. GARLICH,
 JOHN MANGENALKER.